(12) United States Patent
Khim et al.

(10) Patent No.: US 11,759,704 B2
(45) Date of Patent: Sep. 19, 2023

(54) VIDEO GAME CONTROLLER WITH COLLAPSIBLE CONTROL STICK USING A FLUID

(71) Applicant: Sony Interactive Entertainment LLC, San Mateo, CA (US)

(72) Inventors: Jeansoo Khim, San Jose, CA (US); Steven Osman, San Francisco, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 17/717,448

(22) Filed: Apr. 11, 2022

(65) Prior Publication Data

US 2022/0226724 A1 Jul. 21, 2022

Related U.S. Application Data

(63) Continuation of application No. 16/922,521, filed on Jul. 7, 2020, now abandoned.

(51) Int. Cl.
    A63F 13/24 (2014.01)
(52) U.S. Cl.
    CPC .................................. *A63F 13/24* (2014.09)
(58) Field of Classification Search
    None
    See application file for complete search history.

(56) References Cited

U.S. PATENT DOCUMENTS

| 2005/0057502 A1* | 3/2005 | Arneson | H04M 1/233 345/161 |
| 2017/0001106 A1* | 1/2017 | Gassoway | G05G 9/047 |
| 2019/0243468 A1 | 8/2019 | Parazynski et al. | |
| 2019/0302829 A1 | 10/2019 | Guerrero, Jr. | |

FOREIGN PATENT DOCUMENTS

TW M588566 U 1/2020

OTHER PUBLICATIONS

Durrant-Whyte, Hugh "Simultaneous Localization and Mapping: Part 1" IEEE Robotics & Automation Magazine. 13(2): 99-110 (2006).
International Search Report and Written Opinion for International Application No. PCT/US2021/038487, dated Sep. 30, 2021.
Non-Final Office Action for U.S. Appl. No. 16/922,521, dated Dec. 8, 2022.
Taiwanese Office Action for Taiwanese Code Application No. 110119486, dated May 20, 2022.

* cited by examiner

*Primary Examiner* — Peter J Iannuzzi
(74) *Attorney, Agent, or Firm* — JDI PATENT; Joshua Isenberg; Robert Pullman

(57) ABSTRACT

A controller, thumbstick, or system comprising a thumbstick body, a thumbstick shaft coupled to the thumbstick body wherein the thumbstick shaft is configured to retract into the thumbstick body and wherein the thumbstick body and the thumbstick shaft is freely rotatable together around a pivot center within the controller body. In some implementations the thumbstick body included a fluid and the thumbstick shaft displaces the fluid when the thumbstick shaft retracts into the thumbstick body.

12 Claims, 7 Drawing Sheets

VIDEO GAME CONTROLLER WITH COLLAPSIBLE CONTROL STICK USING A FLUID

FIELD OF THE DISCLOSURE

The present disclosure relates to the field of controllers. Specifically, aspects of the present disclosure relate to portable game controllers.

BACKGROUND OF THE INVENTION

Game controllers have been used to control a variety of computing devices from computers to game consoles. Portable computing devices typically have had limited options for joystick type game controller inputs. Joysticks generally include a stick that pivots on a base. A mechanism in the base reports an angle or direction to the device it is controlling. In some implementations, the mechanism also reports a magnitude.

Joysticks that are comfortable to use are also not very portable because generally the stick of the joystick must be around the same size as the user's hand to be comfortably held. This means that having a joystick on a portable computing device is impractical.

Analog nubs are portable but also very uncomfortable for the user. Analog nubs are similar to joysticks in that they pivot on a base and report an angle or direction to the device it is controlling. Instead of a stick, the analog nub has a flat surface or rough area on a sphere. The user moves the flat surface or rough area with pressure from their thumb. This can become quite uncomfortable after a while because the required friction between the user's thumb and the surface.

Thumbsticks represent a third option for controller input. Similar to joysticks; they pivot on a base and report an angle or direction (and sometimes a magnitude) to the device being controlled. Unlike a joystick, the thumbstick includes a small protrusion that the user moves with their thumb instead of a stick that the user grasps. The thumb stick is more comfortable for the user than the analog nub and is smaller than a joystick but is still not very portable. The protrusion of the thumbstick sticks up from the surface of the controller and can easily be caught clothing or other thin materials making the thumbstick prone to breakage.

It is within this context that embodiments of the present invention arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1:
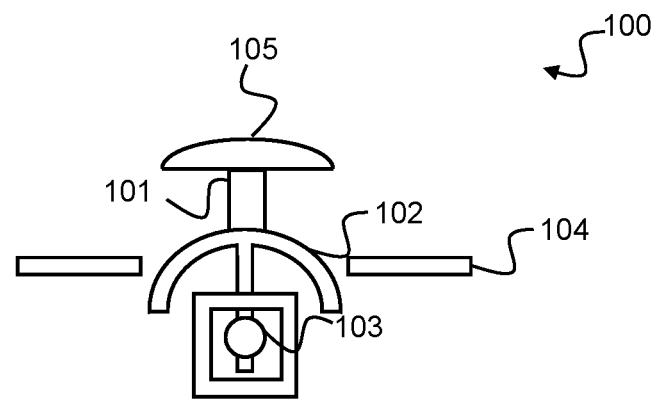
FIG. 1 shows a cut away side view of a prior art thumbstick.

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

While numerous specific details are set forth in order to provide a thorough understanding of embodiments of the invention, those skilled in the art will understand that other embodiments may be practiced without these specific details. In other instances, well-known methods, procedures, components, and circuits have not been described in detail so as not to obscure aspects of the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, are herein to describe structural relationships between components of an apparatus for performing operations described herein. It should be understood that these terms are not intended as synonyms for each other. Rather, in some particular instances, "connected" may indicate that two or more elements are in direct physical or electrical contact with each other. In some other instances, "connected", "connection", and their derivatives are used to indicate a logical relationship, e.g., between node layers in a neural network. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

Prior Art Thumbstick

FIG. 1 depicts an embodiment of a prior art thumbstick. As shown the thumbstick includes a thumbstick shaft 101, thumbstick body 102 and a pivot center 103. Also shown is a portion of the body 104 of a controller or other apparatus on which the thumbstick is connected. In this prior art thumbstick the shaft 101 is rigidly connected to the body 102 and the shaft 101 and body 102 rotate about the pivot center 103 and such rotation may be confined by the controller body 104. A pivot sensor detects rotation of the thumbstick about the pivot center 103. The pivot sensor may also include a button for thumbstick click functionality.

The prior art thumbstick body 102 may be a hollow hemispherical structure configured to avoid hitting the pivot center 103 during use. Additionally, the prior art thumbstick body 102 may completely cover the opening of the of the controller body 104 to protect the pivot center 103 from dust or other contaminants that may interfere with the functions of the pivot center. The prior art thumb stick shaft 101 may be a solid rubber, plastic, metal, or composite material. The thumbstick shaft 101 may additionally include a flat thumb surface 105 on which the user can comfortably rest their thumbs during use.

Collapsible Thumbstick

Figure 2A:
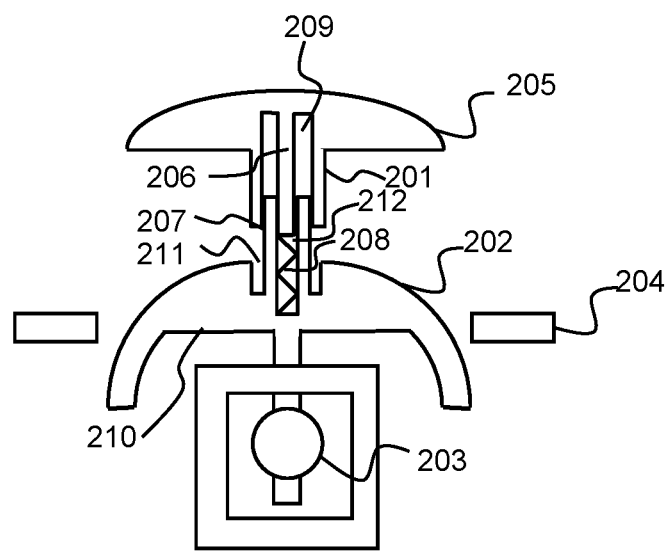
FIG. 2A shows a cutaway side view of a collapsible thumbstick according to aspects of the present disclosure.

FIG. 2A depicts a collapsible thumbstick according to aspects of the present disclosure. As shown, a thumbstick shaft 201 may include a shaft cavity 209 and a shaft guide rod 206. Optionally, the thumbstick shaft 201 may include a thumb surface 205 with a larger area than the cross-section of the thumbstick shaft that provides a comfortable rest for the user's thumb. The thumbstick body 202 may include body guide walls 207, a reinforced base 210, an outer body cavity 211 and an inner body cavity 212. Additionally, a spring 208 may (optionally) be located in the inner body cavity 212. The thumbstick shaft 201 is configured to fit around the body guide walls 207 with the shaft guide rod 206 fitting within the inner body cavity 212 in a telescoping fashion. The spring 208 may be seated within the inner body cavity 212 and push against the shaft guide rod 206. Lateral movement of the spring may be confined by the body guide walls 207. The reinforced base 210 of the thumbstick body 202 may be thicker than other portions of the thumbstick body to provide enhanced rigidity required for operation of the collapsible thumbstick.

Figure 2B:
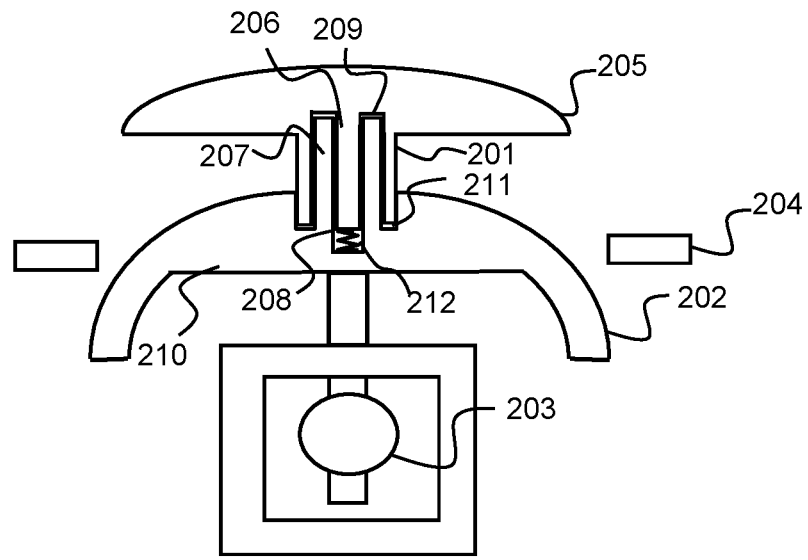
FIG. 2B depicts a cut away side view of the collapsible thumbstick of FIG. 2A with its shaft retracted into a thumbstick body according to aspects of the present disclosure.

The thumbstick shaft 201 may retract into thumbstick body 202 as shown in FIG. 2B. FIG. 2B is a diagram that depicts a cut away side view of the thumbstick shaft retracted into the thumbstick body according to aspects of the present disclosure. Specifically, the thumbstick shaft 201 may retract into the outer body cavity 211, as shown. The body guide walls 207 push up into the shaft cavity 209 with the shaft guide rod 206 pushing down into the inner body cavity 212. Retracting the thumbstick shaft 201 into the thumbstick body 202 forces the shaft guide rod 206 into the inner body cavity 212 compressing the spring 206. When the thumbstick shaft 201 extends out from the retracted state the spring 206 may provide additional force to aid in the extension as the spring 206 decompresses. In some implementations, the shaft guide rod 206 or thumbstick shaft 201 may include a tab that fits into a guide channel formed in the body guide walls 207. The guide walls 206 may also include a dead-end retention slot that the tab may sit in and stop the thumbstick shaft 201 from retracting into the thumbstick body 202. The guide walls additionally may include a shelf that the tab may push against and which stops the thumbstick from extending. For example, and without limitation, the thumbstick shaft 201 may be retracted and then turned to stop extension or extended and turned to stop retraction. The reinforced body 210 area thickens a portion of the body area to support the apparatus and to provide enhanced rigidity. This thickening decreases the depth of the half spherical thumbstick body 202 as such the thumbstick body must sit higher above the pivot center 203 than the prior art thumbstick 100 to avoid hitting the pivot center 203 during use. Additionally, the depth of the outer body cavity 211 and inner body cavity 212 limit the depth of retraction of the thumbstick shaft 201.

Figure 3A:
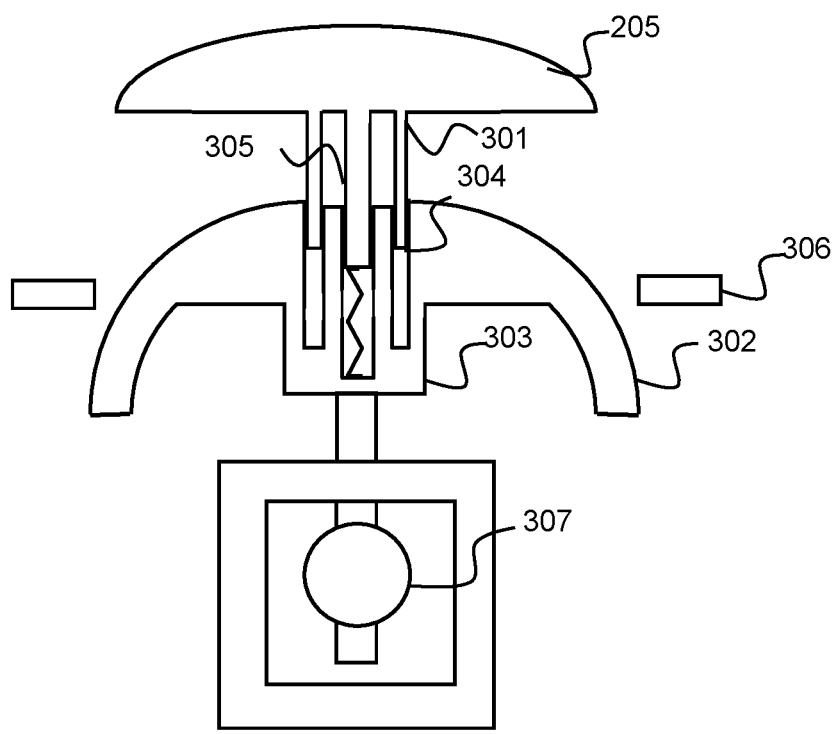
FIG. 3A is a cutaway side view of a collapsible thumbstick with a deepened body cavity in the extended state according to aspects of the present disclosure.
Figure 3B:
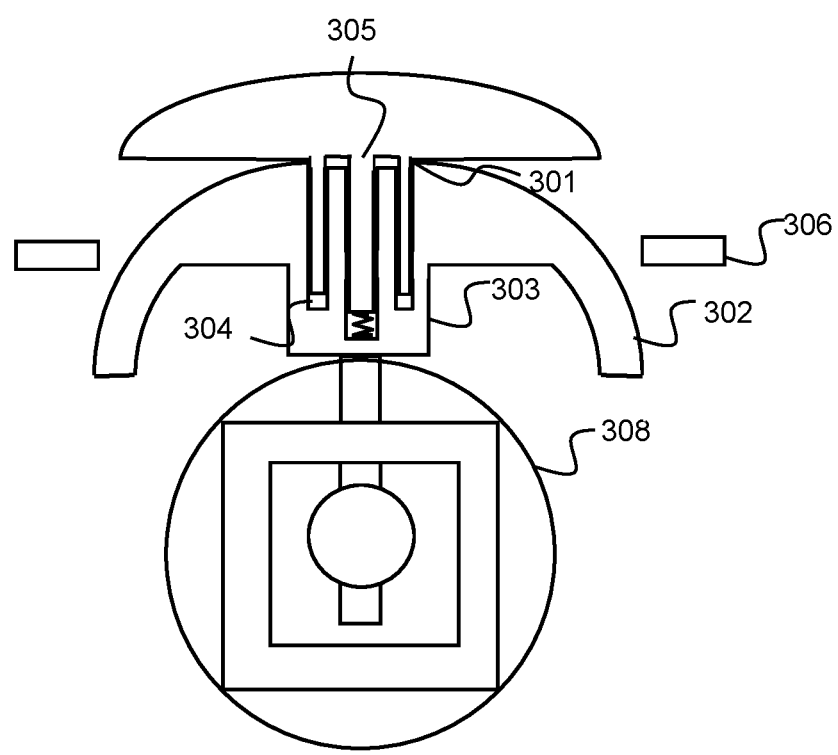
FIG. 3B is a cutaway side view of a collapsible thumbstick with a deepened body cavity in the retracted state according to aspects of the present disclosure.

FIG. 3A and FIG. 3B depict a collapsible thumbstick with a deepened body cavity according to aspects of the present disclosure. The implementation shown in FIG. 3A and FIG. 3B seeks to improve upon the thumbstick shown in FIGS. 2A and 2B by providing a deepened outer body cavity 304 and inner body cavity 305. FIG. 3A depicts an alternative collapsible thumbstick according to aspects of the present disclosure in the extended position. Here, the thumbstick shaft 301 is lengthened to strengthen the connection between the thumbstick body and the thumbstick shaft when in the extended state. A protruding reinforced area 303 of the thumbstick body accommodates a longer outer body cavity 304 and inner body cavity 305. The reinforced area 303 allows the thumbstick shaft 301 to sit closer to the thumbstick body 302 when in the retracted state and as such the thumb surface 205 sits closer to the controller 306 as shown in FIG. 3B. Lengthening the reinforced area 303 may also allow the thumbstick body to lie closer to the pivot center 307. The reinforced area 303 of the thumbstick body may be placed just outside a circle 308 circumscribed by the edges of the pivot center 307 to prevent the thumbstick body from interfering with the range of motion of the thumbstick about a joint.

Figure 4A:
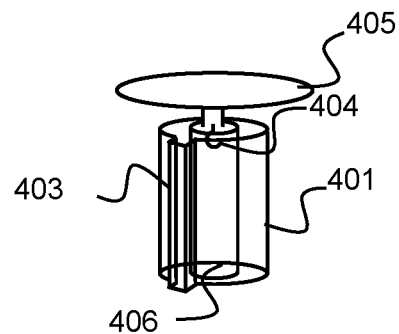
FIG. 4A is a wire-frame isometric view of a thumbstick shaft with a tab according to aspects of the present disclosure.

FIG. 4A depicts a thumbstick shaft with a tab according to aspects of the present disclosure. As shown the thumbstick shaft 401 includes a tab 403. In this example the tab runs the length of the portion of the thumbstick shaft that inserts in to the thumbstick body but aspects of the present disclosure are not so limited and may include a smaller tab, multiple tabs and/or different tabs shapes such as regular shapes triangular, hexagonal, octagonal, etc. or irregular shapes. The illustrated thumbstick shaft 401 includes a shaft attachment element 404 (e.g., a hook) located inside a shaft attachment cavity 406 for attaching an elastic element such as a spring or elastic band. The thumbstick shaft also includes a thumbstick surface 405 to aid in use. The surface 405 also includes a narrow neck connected to the thumbstick shaft 401, which may allow for a greater range of movement of the thumbstick shaft by reducing interference from the controller body.

Figure 4B:
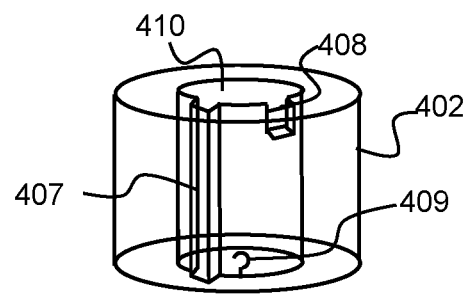
FIG. 4B is a diagram showing a wire-frame isometric view of a thumbstick body with a slot and channel according to aspects of the present disclosure.

FIG. 4B shows a thumbstick body with a slot and channel according to aspects of the present disclosure. The thumbstick body 402 includes a retention slot 408, which is at least wide enough for the tab 403 to fit in it in the illustrated implementation. In other alternative implementations, the slot may be configured to fit any dimension of the tab or a portion of the tab such that when the tab is placed in the slot retraction of the thumbstick shaft into the thumbstick body is prevented. The thumbstick body 402 also includes a channel 407 that is also at least the width of the tab 403. The depth of the channel 407 may determine a retraction depth to which the thumbstick shaft can retract in to the thumbstick body. Additionally, the channel may include a shelf that is configured to fit a dimension of the tab such that when the tab is moved onto the shelf extension of the shaft is prevented. The thumbstick body 402 further includes a body attachment element 409 (e.g., a hook) for attaching the elastic connection 411.

The thumbstick shaft 401 and thumbstick body 402 may be made from any suitable material such as plastic, aluminum, steel, magnesium, rubber, or a combination of materials such as rubber coated steel. Features of the thumbstick shaft 401 such as the tab 403 and flat surface 405 and features of thumbstick body 402 such as the retention slot 408 and the channel 407 may be configured during formation such as by casting, thermoforming, additive manufacturing or subtractive manufacturing.

Figure 4C:
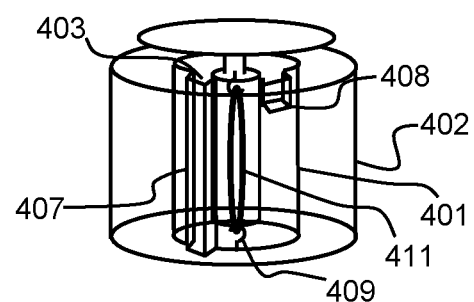
FIG. 4C is a diagram depicting a wire-frame isometric view of a thumbstick shaft retracted in to the thumbstick body according to aspects of the present disclosure.

FIG. 4C depicts a thumbstick shaft retracted in to the thumbstick body according to aspects of the present disclosure. Here the thumbstick shaft 401 is seated within a cavity of the thumbstick body 402. The outside diameter of the thumbstick shaft 401 is less than the inside diameter of the thumbstick body 402 allowing the thumbstick shaft 401 to freely retract and extend without excessive resistance. The tab 403 of the thumbstick shaft 402 fits in the channel 407 of the thumbstick body 402. In the retracted state, as shown, the retention slot 408 is vacant and the channel is at least partially filled by the tab 403. The width of the tab is less than the width of the channel 407. In alternative implementations, the thumbstick body may include a shelf that prevents the thumbstick shaft from extending when in the retracted state. An elastic connection 411 extends from the body attachment surface 409 to the shaft attachment surface 404 and ensures that the thumbstick shaft stay in the retracted state. The elastic connection may be by way of example and not by way of limitation a rubber band, a spring, a piston, elastic fiber etc. The attachment elements 409, 404 may be any suitable attachment means, by way of example and not by way limitation hooks, screws, glue, rivets, or eyelets formed in the body and shaft.

Figure 4D:
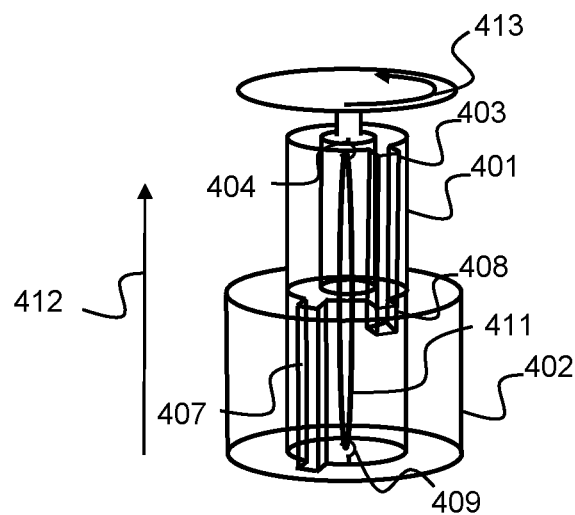
FIG. 4D is a diagram showing a wire-frame isometric view of the thumbstick shaft extended from the thumbstick body according to aspects of the present disclosure.

FIG. 4D shows the thumbstick shaft extended from the thumbstick body according to aspects of the present disclosure. Here, the thumbstick shaft 401 has been pulled out 412 from the thumbstick body 402 and turned in the direction indicated by the curved arrow 413 so that the tab 403 is seated in the retention slot 408. The slot 408 is less deep than the channel 407 and prevents retraction of the thumbstick shaft 401 into the controller body to a retraction depth. The elastic connection 411 applies a retraction force that pulls and the thumbstick shaft 401 into the thumbstick body 402 and prevents the tab 403 from leaving the retention slot 408. If further upward force 412 is applied and the thumbstick shaft 401 is turned in the direction indicated by the arrow 413 to align the slot 403 with the channel 407 then the tab 401 will fit into the channel 407 and thumbstick shaft 401 will slide into the thumbstick body 402 to the retraction depth.

Although the illustrated thumbstick shaft, the retention slot, and the channel are separate features of the thumbstick body, aspects of the present disclosure are not so limited. In some implementations, the slot and channel are connected and the upward travel of the thumbstick shaft may be limited by the end of the channel. Alternatively, the tab may be located on the thumbstick body and the channel and slot are located on the thumbstick shaft. In yet other alternative implementations, both the thumbstick shaft and the thumbstick body each include at least one tab, channel, and slot. As discussed above while one tab, channel and slot are illustrated and discussed above, in alternative implementations there may be any number of tabs, channels and slots. In yet other alternative implementations, the slot may be omitted leaving only the channel and the outer surface of the thumbstick body may prevent retraction of the thumbstick shaft into the thumbstick body.

Figure 5:
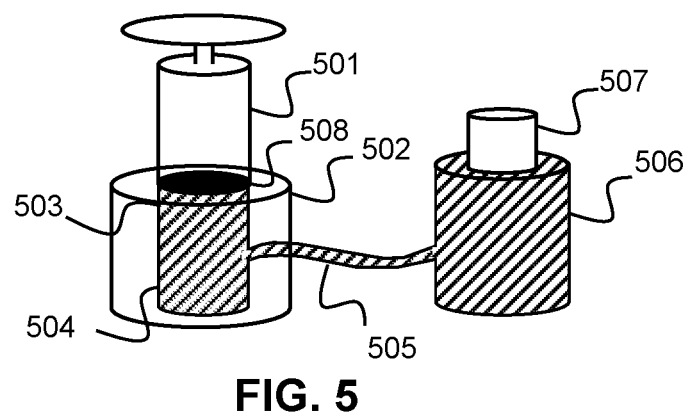
FIG. 5 is a diagram depicting a wire-frame isometric view of the thumbstick shaft and thumbstick body having a non-Newtonian liquid according to aspects of the present disclosure.

FIG. 5 is a diagram depicting the thumbstick shaft and thumbstick body having a non-Newtonian liquid according to aspects of the present disclosure. As generally understood by those skilled in the art, a non-Newtonian fluid is characterized by a viscosity that can behave either more like a liquid or more like a solid when under force. The thumbstick shaft 501 includes a liquid interface surface 508 and may be solid. The thumbstick body 502 includes a thumbstick body cavity 503 filled with a non-Newtonian fluid 504. The thumbstick cavity 503 may be fluidly coupled 505 to a reservoir 506. The reservoir 506 may include a pressure source 507 that applies pressure to the reservoir 506. The pressure source 507 may be a piston or elastic member that decreases the volume of the reservoir 506 and consequently increases the pressure of the fluid in the reservoir 506 and the thumbstick body cavity 503. To retract the thumbstick shaft 501 slow pressure may be applied to the thumbstick shaft 501 into the thumbstick body 502. The liquid interface surface 508 may displace the non-Newtonian fluid into the reservoir 506 and further displace the pressure source 507. Due to the nature of the non-Newtonian fluid, a quick application of pressure to the thumbstick shaft 501 will cause an increase in the viscosity of the non-Newtonian fluid and the fluid will not be displaced. Thus, during use the thumbstick shaft will not retract into the thumbstick body because the pressure during use is not applied slow enough to displace the non-Newtonian fluid. The non-Newtonian fluid may be by way of example and not by way of limitation, a mixture of 1 part water to 1.5 to 2 parts cornstarch (sometimes called Oobleck), Crosslinked Polyvinyl Alcohol polymer gel, or polydimethylsiloxane.

Figure 6:
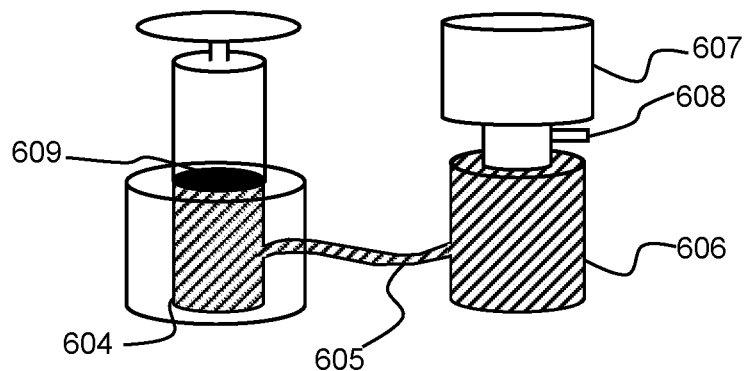
FIG. 6 is a diagram depicting a wire-frame isometric view of the thumbstick shaft and thumbstick body having a liquid and actuator according to aspects of the present disclosure.

FIG. 6 depicts a thumbstick shaft and thumbstick body having a liquid and actuator according to aspects of the present disclosure. A thumbstick shaft 601 may include a liquid interface surface 609. The interface surface 609 may be a solid flat surface, semispherical surface or any surface configured to displace a liquid. The thumbstick body 602 may include a thumbstick body cavity 603 filled with a fluid 604. The fluid 604 may be any fluid, such as water, mineral oil, ethylene glycol, propylene glycol or a similar liquid. It should be noted that high viscosity liquids may impair response time therefore liquids having a lower viscosity may be preferred. The fluid may be a Newtonian or non-Newtonian fluid. The thumbstick body cavity 603 may be fluidly coupled 605 to a reservoir 606. As used herein "fluidly coupled" means that two elements are arranged such that free movement of fluid or transmission of fluid pressure is possible between the two elements. The movement of fluid or transmission of fluid pressure between elements may be implemented directly between elements or through intermediate elements such as fluid pipes, fluid channels or fluid ducts connected to the elements. A plunger or piston 608 and actuator 607 may be coupled to the reservoir 606. By way of example, and not by way of limitation, the actuator 607 may convert electricity into physical force on the plunger or piston 608. The physical force applied to the plunger pushes the plunger into the reservoir. The actuator 607 may be coupled to other circuitry in the controller that determines whether the thumbstick shaft should be extended or retracted. The circuitry may also use information from a pressure sensor to determine the amount of physical force the actuator 608 should apply on the plunger 608 into the reservoir 606. When the thumbstick shaft 601 is retracted at the retraction depth, a signal from the other circuitry in the controller causes the actuator 607 to apply force onto the plunger or piston 608. The applied force pushes the plunger or piston 608 in to the reservoir 606 displacing fluid from the reservoir into the thumbstick body cavity 603 through the fluid coupling 605. The resulting fluid displacement extends the thumbstick shaft 601. To retract the thumbstick shaft 601 a signal from the other circuitry in the controller may cause the actuator 607 to reduce force on the plunger or piston 608. The reduced force allows the plunger or piston to be displaced increasing the volume of the reservoir 606. Thus, when a force from the user pushes the thumbstick shaft 601 into the thumbstick body cavity 603 the fluid may be displaced and push the plunger or piston 608 to increase the volume of the reservoir, filling the volume taken up by the plunger or piston 608 with fluid.

Alternatively, the actuator 607 may apply force in the opposite direction on the plunger or piston 608 pulling the plunger or piston out the reservoir. The reservoir 606, thumbstick body cavity 603 and fluid coupling 605 may be a sealed fluid tight system. Thus, pulling out the piston or plunger 608 increases the volume of the reservoir and causes a decrease in pressure around the thumbstick shaft 601 retracting the thumbstick shaft 601 into the thumbstick body cavity 603.

Figure 7:
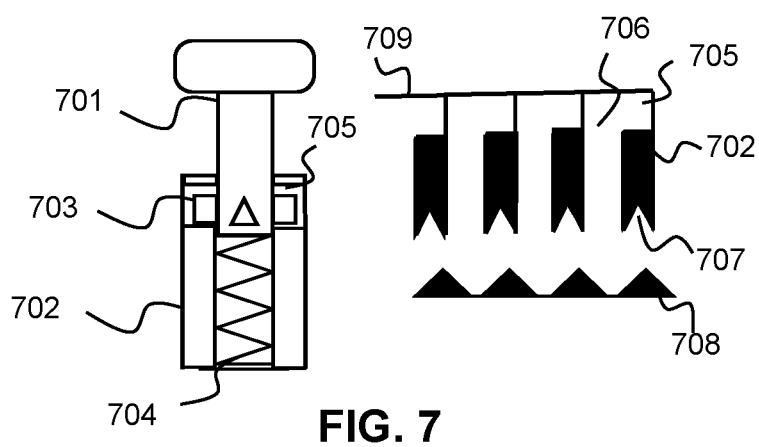
FIG. 7 is a diagram that depicts a cutaway view of the thumbstick shaft with tab and thumbstick body assembly with an unrolled view of the features of the thumbstick body including multiple slots, channels and shelves according to aspects of the present disclosure.

FIG. 7 depicts a thumbstick shaft with a tab and thumbstick body assembly with an unrolled view of the features of the thumbstick body including multiple slots, channels, and shelves according to aspects of the present disclosure. In the implementation shown in FIG. 7, the mechanism for retracting and extending the thumbstick shaft is comparable to that used in a retractable pen. The thumbstick shaft 701 shown includes four triangular shaped tabs 703. A spring 704 applies an outward force to the thumbstick shaft 701 away from the thumbstick body 702. As shown the thumbstick tabs 703 are in a slot 705 of the thumbstick body 702. The unrolled features 709 of the thumbstick body 702 shows the path for the tabs 703 of the thumbstick shaft 701. Turning the extended thumbstick shaft 701 prevents retractions by placing the tab 703 in the slot 705. When the tab 703 is in the channel 706, pushing the thumbstick down will cause retraction. Cam surfaces 708 provide lateral movement to the tab 703 guiding the tab onto a shelf 707 and preventing the thumbstick shaft 701 from extension. In the retracted state, where the tab is on the shelf 707, a slight downward force will cause the tab 703 to move against the cam surfaces 708 guiding the tab 703 back into the channel 706 and turning the thumbstick shaft 701 slightly.

System

Figure 8:
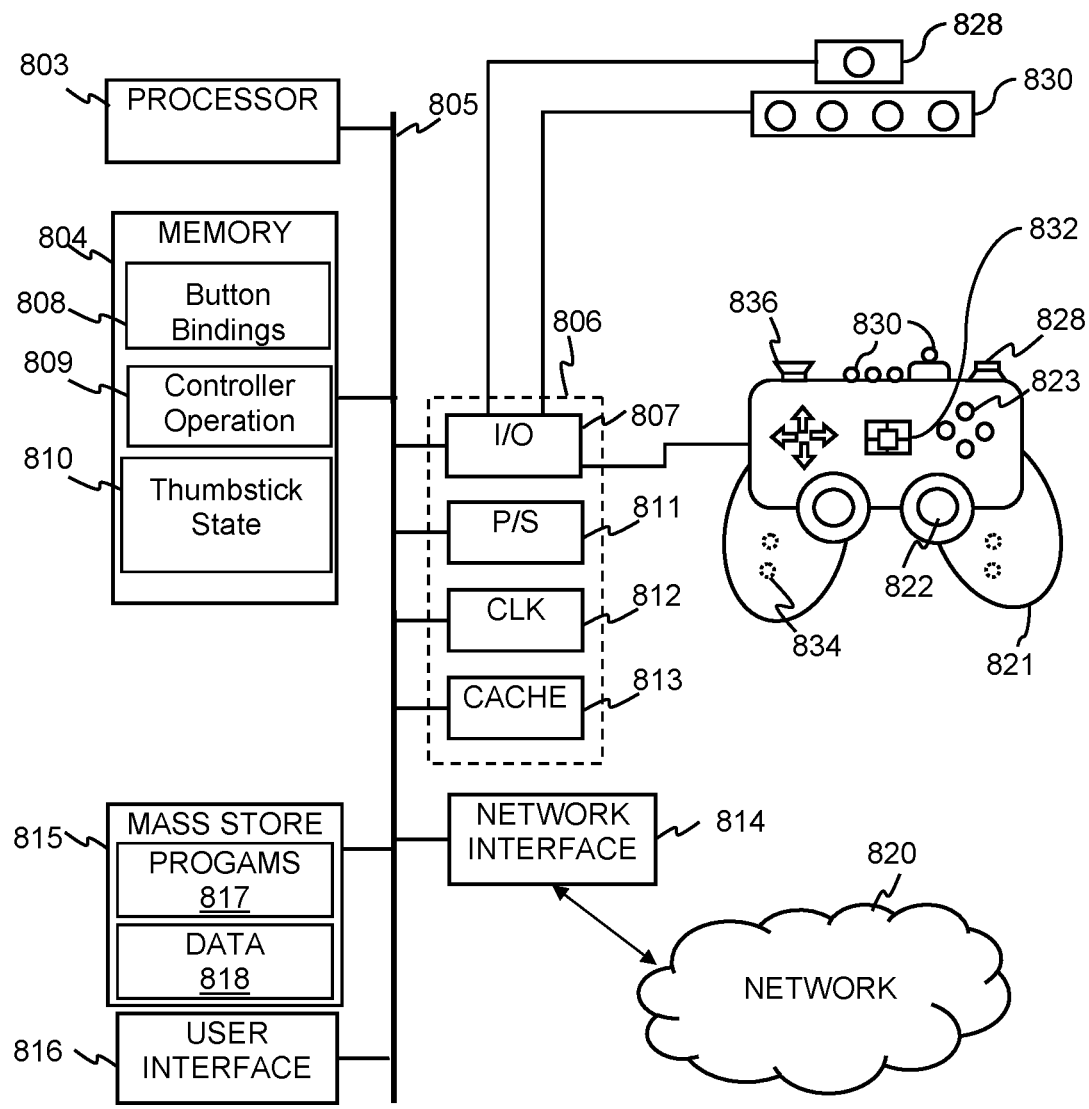
FIG. 8 depicts a system having a controller with collapsible analog stick according to aspects of the present disclosure.

FIG. 8 depicts a system 800 having a controller with collapsible analog stick according to aspects of the present disclosure. The system 800 may include one or more processor units 803, which may be configured according to well-known architectures, such as, e.g., single-core, dual-core, quad-core, multi-core, processor-coprocessor, cell processor, and the like. The marketplace server may also include one or more memory units 804 (e.g., random access memory (RAM), dynamic random-access memory (DRAM), read-only memory (ROM), and the like).

The processor unit 803 may execute one or more programs 817, portions of which may be stored in the memory 804 and the processor 803 may be operatively coupled to the memory, e.g., by accessing the memory via a data bus 805. The programs 817 may be configured to operate the controller 809 and change the thumbstick state 810 from retracted to extended and vice versa. The controller operation 809 may also use button bindings 808 to interpret button presses from the controller 821 to determine inputs for the system. The controller operation, button bindings and thumbstick state may also be stored as data 818 in the Mass Store 818.

The system 800 may also include well-known support circuits 806, such as input/output (I/O) 807, circuits, power supplies (P/S) 811, a clock (CLK) 812, and cache 813, which may communicate with other components of the system, e.g., via the bus 805. The computing device may include a network interface 814. The processor unit 803 and network interface 814 may be configured to implement a local area network (LAN) or personal area network (PAN), via a suitable network protocol, e.g., Bluetooth, for a PAN. The computing device may optionally include a mass storage device 815 such as a disk drive, CD-ROM drive, tape drive, flash memory, or the like, and the mass storage device may store programs and/or data. The system may also include a user interface 816 to facilitate interaction between the system and a user. The user interface may include a display device such as monitor, Television screen, speakers, headphones, or other devices that communicate information to the user. The display device may include visual, audio, or haptic display or some combination thereof. A controller 821 such as a mouse, keyboard, game controller, joystick, etc. may communicate with an I/O interface and provide control of the system to a user. The controller has a collapsible thumbstick 822 coupled to the controller.

The controller 821 may have a collapsible thumbstick 822 and conventional buttons 823 that provide control signals commonly used during playing of video games. Such video games may be implemented as processor readable data and/or instructions from the programs for controller operation 809, which may be stored in the memory 804, or other processor readable medium such as one associated with the mass storage device 815.

The collapsible thumbstick 822 may generally be configured so that moving the thumbstick left or right signals movement along the X axis, and moving it forward (up) or back (down) signals movement along the Y axis. In thumbsticks or joysticks that are configured for three-dimensional movement, twisting the stick left (counter-clockwise) or right (clockwise) may signal movement along the Z axis. These three axes—X Y and Z—are often referred to as roll, pitch, and yaw, respectively, particularly in relation to an aircraft.

In addition to conventional features, a tracking device incorporated into the controller 821 may include one or more inertial sensor units 832 having a single mass, which may provide position and/or orientation information to the processor 803 via inertial signals, e.g., displacement signal. Orientation information may include angular information such as a tilt, roll or yaw of the controller 821. By way of example, the inertial sensors may include any number and/or combination of accelerometers, gyroscopes or tilt sensors. In a preferred embodiment, the inertial sensors include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the controller 821. Such techniques may be implemented by instructions from the programs for controller operation 809, which may be stored in the memory 804 and executed by the processor 803.

By way of example an accelerometer suitable as the inertial sensor may be a simple mass elastically coupled at three or four points to a frame, e.g., by springs. Pitch and roll axes lie in a plane that intersects the frame, which is mounted to the controller 821. As the controller 821 rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like. In some embodiments, the inertial sensor may be removably mounted to the controller 821.

In addition, the controller 821 may include one or more light sources 834, such as light emitting diodes (LEDs). The light sources may be used to distinguish one controller from the other. For example, one or more LEDs can accomplish this by flashing or holding an LED pattern code. By way of example, five LEDs can be provided on the controller 821 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by an external image capture unit 828. Furthermore, the LED pattern codes may also be used to determine the positioning of the controller 821 during game play. For instance, the LEDs can assist in identifying tilt, yaw and roll of the controllers. This detection pattern can assist in providing a better user/feel in games, such as aircraft flying games, etc. The image capture unit may capture images containing the controller 821 and light sources Analysis of such images can determine the location and/or orientation of the controller. Such analysis may be implemented by the game application 823 stored in the memory 804 and executed by the processor 804. To facilitate capture of images of the light sources by the image capture unit, the light sources may be placed on two or more different sides of the controller 821, e.g., on the front and on the back (as shown in phantom). Such placement allows the image capture unit to obtain images of the light sources for different orientations of the controller 821 depending on how the controller 821 is held by a user. In alternative implementations, the image capture unit 828 may be located on the controller 821 and images of external objects may be analyzed to determine controller location and/or orientation.

In addition, the light sources may provide telemetry signals to the processor 803, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 803 may decode the telemetry signal from the optical signal and execute a game command in response to the decoded telemetry signal. Telemetry signals may be decoded from analysis of images of the controller 621 obtained by the image capture unit. Alternatively, the system 800 may include a separate optical sensor dedicated to receiving telemetry signals from the lights sources. The use of LEDs in conjunction with determining an intensity amount in interfacing with a computer program is described, e.g., in U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", filed May 4, 2006, which is incorporated herein by reference in its entirety. In addition, analysis of images containing the light sources may be used for both telemetry and determining the position and/or orientation of the controller 821. Such techniques may be implemented by instructions of the program for controller operation 809, which may be stored in the memory 804 and executed by the processor 803.

Alternatively, the image capture unit may be coupled to the controller 821 and light sources placed near the controller may be used with the image capture unit in determining the position of the controller. The light sources may be arranged in a light bar or as individual light sources in a known configuration. Similar to as discussed above the image capture unit may take images of the position and arrangement of light sources, which are sent to the processor 803, which may analyze the images to determine the position of the controller. In yet other alternative implementations, the image capture unit 828 coupled to the controller 821 using simultaneous localization and mapping (SLAM) to determine the position of the controller with or without light sources. Light sources may be used as landmarks for SLAM, without light sources Machine vision techniques may be use to determine landmarks around the room and SLAM may use those land marks and apply various computational algorithms to determine the position of the controller. For more information on SLAM see: Durrant-Whyte, Hugh "Simultaneous Localization and Mapping: Part 1" IEEE Robotics & Automation Magazine. 13(2): 99-110 (2006) the contents of which are herein incorporated by reference.

The processor 804 may use the inertial signals from the inertial sensor in conjunction with optical signals from light sources detected by the image capture unit and/or sound source location and characterization information from acoustic signals detected by a microphone array 830 on the controller or located externally to deduce information on the location and/or orientation of the controller 821 and/or its user. For example, "acoustic radar" sound source location and characterization may be used in conjunction with the microphone array to track a moving voice while motion of the joystick controller is independently tracked (through the inertial sensor and or light sources). In acoustic radar, a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit. Examples of acoustic radar are described in detail in U.S. patent application Ser. No. 11/381,724, to Xiaodong Mao entitled "METHODS AND APPARATUS FOR TARGETED SOUND DETECTION AND CHARACTERIZATION", filed May 4, 2006, which is incorporated herein by reference. Any number of different combinations of different modes of providing control signals to the processor 803 may be used in conjunction with embodiments of the present invention. Such techniques may be implemented by the programs for controller operation 809 which may be stored in the memory 804 and executed by the processor 802 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 828.

In alternative implementations, the microphone array 830 may be located externally and may track the controller 821 acoustically. In such implementations, the controller may include a sound emitter 836 configured to emit sounds, e.g., ultrasound, to facilitate such tracking.

The program for controller operation 809 may optionally include one or more instructions that direct the one or more processors to produce a discrete time domain input signal $x_m(t)$ from microphones $M_0 \ldots M_M$, of the microphone array, determine a listening sector, and use the listening sector in a semi-blind source separation to select the finite impulse response filter coefficients to separate out different sound sources from input signal $x_m(t)$. The program 809 may also include instructions to apply one or more fractional delays to selected input signals $x_m(t)$ other than an input signal $x_0(t)$ from a reference microphone Mo. Each fractional delay may be selected to optimize a signal to noise ratio of a discrete time domain output signal y(t) from the microphone array. The fractional delays may be selected to such that a signal from the reference microphone Mo is first in time relative to signals from the other microphone(s) of the array. The program 809 may also include instructions to introduce a fractional time delay $\Delta$ into an output signal y(t) of the microphone array so that: $y(t+\alpha)=x(t+\alpha)*b_0+x(t-1+\Delta)*b_1+x(t-2+\Delta)*b_2+ \ldots +x(t-N+\Delta)b_N$, where $\Delta$ is between zero and ±1. Examples of such techniques are described in detail in U.S. patent application Ser. No. 11/381,729, to Xiaodong Mao, entitled "ULTRA SMALL MICROPHONE ARRAY" filed May 4, 2006, the entire disclosures of which are incorporated by reference.

The program 809 may include one or more instructions which, when executed, cause the system 800 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array and the attenuation to an optimum value. The instructions may, when executed, cause the apparatus 800 to determine a value of an attenuation of the input signals for one or more sectors and select a sector for which the attenuation is closest to an optimum value. Examples of such a technique are described, e.g., in U.S. patent application Ser. No. 11/381,725, to Xiaodong Mao, entitled "METHODS AND APPARATUS FOR TARGETED SOUND DETECTION" filed May 4, 2006, the disclosures of which are incorporated herein by reference.

Signals from the inertial sensor may provide part of a tracking information input and signals generated from the image capture unit from tracking the one or more light sources may provide another part of the tracking information input. By way of example, and without limitation, such "mixed mode" signals may be used in a football type video game in which a Quarterback pitches the ball to the right after a head fake head movement to the left.

Specifically, a game player holding the controller 821 may turn his head to the left and make a sound while making a pitch movement swinging the controller out to the right like it was the football. The microphone array in conjunction with "acoustic radar" program code can track the user's voice. The image capture unit can track the motion of the user's head or track other commands that do not require sound or use of the controller. The sensor may track the motion of the joystick controller (representing the football). The image capture unit may also track the light sources on the controller 821. The user may release of the "ball" upon reaching a certain amount and/or direction of acceleration of the controller 821 or upon a key command triggered by pressing a button on the controller 821.

In certain embodiments of the present invention, an inertial signal, e.g., from the inertial sensor 832, e.g., an accelerometer or gyroscope, may be used to determine a location of the controller 821. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit and light sources the inertial sensor may be subject to a type of error known as "drift" in which errors that accumulate over time can lead to a discrepancy D between the position of the controller 821 calculated from the inertial signal (shown in phantom) and the actual position of the controller 821.

The program code 809 may optionally include processor executable instructions including one or more instructions which, when executed cause the image capture unit to monitor a field of view in front of the image capture unit, identify one or more of the light sources within the field of view, detect a change in light emitted from the light source(s); and in response to detecting the change, triggering an input command to the processor 803. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 809 may optionally include processor executable instructions including one or more instructions which, when executed, use signals from the inertial sensor and signals generated from the image capture unit from tracking the one or more light sources as inputs to a game system, e.g., as described above.

Although embodiments of the present invention are described in terms of examples related to a video game controller 821 games, embodiments of the invention, including the system 800 may be used on any user manipulated body, molded object, knob, structure, etc., with inertial sensing capability and inertial sensor signal transmission capability, wireless or otherwise.

While the above is a complete description of the preferred embodiment of the present invention, it is possible to use various alternatives, modifications, and equivalents. It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description.

Although the present invention has been described with reference to specific exemplary embodiments, it will be recognized that the invention is not limited to the embodiments described but can be practiced with modification and alteration within the spirit and scope of the appended claims. The scope of the invention should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the items following the article, except where expressly stated otherwise. The appended claims are not to be interpreted as including means-plus-function limitations, unless such a limitation is explicitly recited in a given claim using the phrase "means for."

What is claimed is:

1. A controller comprising;
   a controller body;
   a thumbstick body coupled to the controller body;
   a thumbstick shaft coupled to the thumbstick body wherein the thumbstick shaft is configured to retract into the thumbstick body and wherein the thumbstick body and the thumbstick shaft is freely rotatable together around a pivot center within the controller body; and
   a fluid within the thumbstick body, wherein the thumbstick shaft displaces the fluid when the thumbstick shaft retracts into the thumbstick body.

2. The controller of claim 1 further comprising a reservoir coupled to the thumbstick body configured to contain the fluid displaced by the thumbstick shaft.

3. The controller of claim 1 wherein the fluid is a non-Newtonian fluid.

4. The controller of claim 2 further comprising an actuator and a plunger coupled to the reservoir wherein the actuator applies force to the plunger which pressurizes the fluid in the thumbstick body forcing the thumbstick shaft to slide out from the thumbstick body.

5. The controller of claim 4 further comprising a pressure sensor coupled to the reservoir and the actuator wherein a pressure within the reservoir detected by the pressure sensor causes the actuator to reduce a force applied to the plunger allowing the thumbstick shaft to retract into the thumbstick body.

6. A thumbstick, comprising:
   a thumbstick body;
   a thumbstick shaft coupled to the thumbstick body wherein the thumbstick shaft is configured to retract into the thumbstick body and wherein the thumbstick body and the thumbstick shaft are configured to freely rotate together around a pivot center within a controller body; and
   a fluid within the thumbstick body, wherein the thumbstick shaft displaces the fluid when the thumbstick shaft retracts into the thumbstick body.

7. The thumbstick of claim 6 further comprising a reservoir coupled to the thumbstick body configured to contain the fluid displaced by the thumbstick shaft.

8. A computer system, comprising:
   a computer element having a processor and memory coupled to the processor; and
   a controller configured to interoperate with the computer element, wherein the controller includes a controller body, a thumbstick body coupled to the controller body, a thumbstick shaft coupled to the thumbstick body wherein the thumbstick shaft is configured to retract into the thumbstick body and wherein the thumbstick body and the thumbstick shaft are freely rotatable together around a pivot center within the controller body; and
   a fluid within the thumbstick body, wherein the thumbstick shaft displaces the fluid when the thumbstick shaft retracts into the thumbstick body.

9. The computer system of claim 8 further comprising a reservoir coupled to the thumbstick body configured to contain the fluid displaced by the thumbstick shaft.

10. The computer system of claim 8 wherein the fluid is a non-Newtonian fluid.

11. The computer system of claim 9 further comprising an actuator and a plunger coupled to the reservoir wherein the actuator applies force to the plunger which pressurizes the fluid in the thumbstick body forcing the thumbstick shaft to slide out from the thumbstick body.

12. The computer system of claim 11 further comprising a pressure sensor coupled to the reservoir and the actuator wherein a pressure within the reservoir detected by the pressure sensor causes the actuator to reduce a force applied to the plunger allowing the thumbstick shaft to retract into the thumbstick body.

* * * * *